United States Patent [19]

Thiriet

[11] Patent Number: 6,101,254

[45] Date of Patent: Aug. 8, 2000

[54] SECURITY METHOD FOR MAKING SECURE AN AUTHENTICATION METHOD THAT USES A SECRET KEY ALGORITHM

[75] Inventor: Fabien Thiriet, Orleans, France

[73] Assignee: Schlumberger Systemes, Montrouge, France

[21] Appl. No.: 08/960,574

[22] Filed: Oct. 29, 1997

[30] Foreign Application Priority Data

Oct. 31, 1996 [FR] France .................................. 96 133337

[51] Int. Cl.[7] ..................................................... H04L 9/00
[52] U.S. Cl. ............................................... 380/2; 713/172
[58] Field of Search .............................. 380/1, 2, 23, 25, 380/49; 713/168, 172, 144

[56] References Cited

U.S. PATENT DOCUMENTS

| 5,191,608 | 3/1993 | Geronimi . | |
| 5,436,971 | 7/1995 | Armbrust | 380/23 |
| 5,533,126 | 7/1996 | Hazard | 380/25 |
| 5,550,919 | 8/1996 | Kowalski . | |

FOREIGN PATENT DOCUMENTS 0708413  4/1996  European Pat. Off. .

OTHER PUBLICATIONS

IBM Technical Disclosure Bulletin, vol. 14, No. 1 Jun. 1971 pp. 16–17, XP002040870 A.J. Anello et al.: "Error Checking by Pseudoduplication".

Primary Examiner—Pinchus M. Laufer
Assistant Examiner—Ho S. Song
Attorney, Agent, or Firm—Birch, Stewart, Kolasch & Birch, LLP

[57] ABSTRACT

The security method is associated with an authentication method comprising steps of obtaining a calculated result from a random number subjected to a secret key algorithm, the security method includes steps of calculating a test result from a reference random number subjected to the secret key algorithm, of comparing the test result with a reference result, and of ensuring that the calculated result is transmitted only when the test result is identical to the reference result.

10 Claims, 2 Drawing Sheets

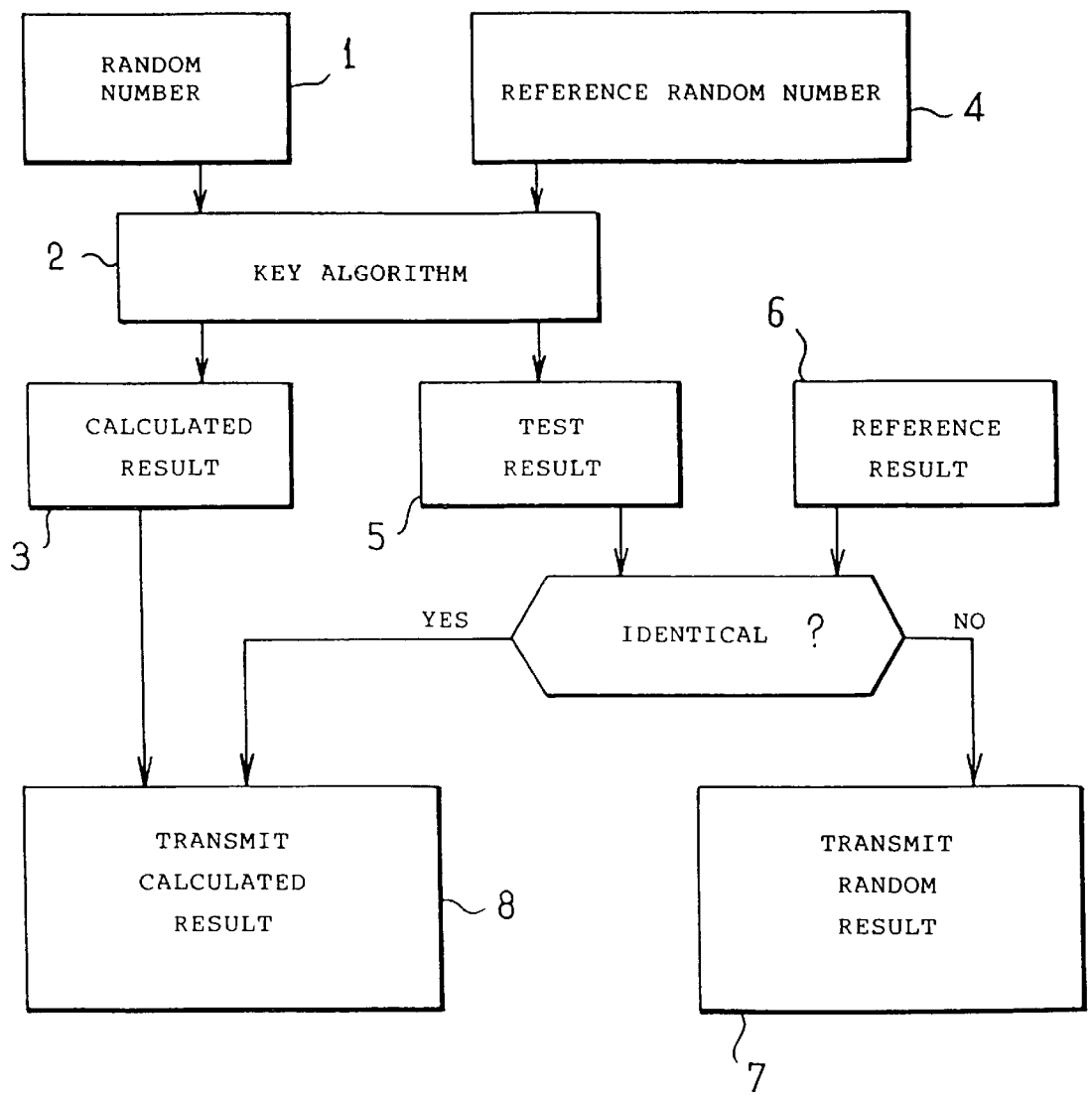
FIG_1

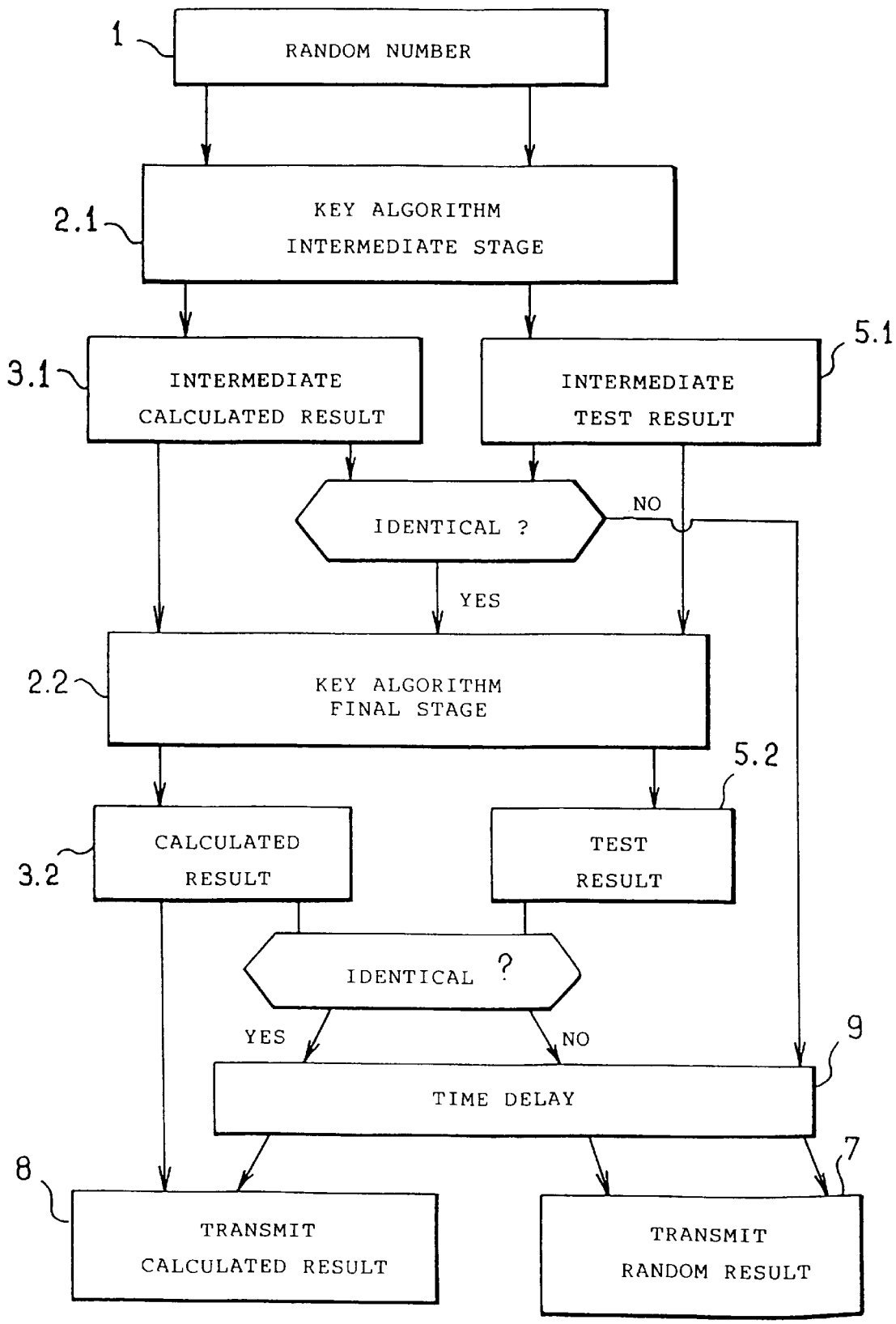
FIG_2

SECURITY METHOD FOR MAKING SECURE AN AUTHENTICATION METHOD THAT USES A SECRET KEY ALGORITHM

The present invention relates to a security method for making secure an authentication method that uses a secret key algorithm.

BACKGROUND OF THE INVENTION

Authentication methods are known that make use of a secret key algorithm for the purpose of controlling access to a terminal, to a memory zone, or to a machine. For example, in the case of accessing a terminal by means of an integrated circuit card, the authentication method includes the steps of causing the terminal to issue a random number, of subjecting said random number to the secrete key algorithm contained in the memory of the integrated circuit and inaccessible from the outside for reading and for writing, and in transmitting the calculated result that is obtained to the terminal. In parallel, the terminal has available an authentication result obtained either by performing an analogous calculation in a security module present in the terminal or else by a link with a central organization that performs an analogous calculation or that has a correspondence table between the issued random number and the authentication result that ought to be obtained. The result calculated in the card and the authentication result are then compared and access is authorized only if the calculated result and the authentication result are identical.

A person attempting to get round the authentication method needs to discover the secret key which is stored in inaccessible manner in the card, given that the algorithm itself is generally of a known type. Physical access to the secret key is made practically impossible by existing protection techniques and, without being able to gain access directly to the secret key, attackers with access to powerful computer means have developed algorithms for reconstituting a secret key on the basis of calculation errors in the secret key algorithm, which calculation errors can be provoked by subjecting a memory zone containing the secret key algorithm or a working memory zone of the microprocessor to abnormal stresses such as ion bombardment, mechanical stress, heat stress, light stress, electrical stress, magnetic stress, . . . .

Certain types of secret key reconstitution algorithm proceed by issuing the same number to be subjected to the secret key algorithm on successive occasions and in analyzing the different results obtained when the secret key algorithm is subjected to disturbances that give rise to calculation errors. In order to counter such reconstitution algorithms, proposals have been made to disable the secret key algorithm in the event of the same number being submitted on successive occasions. However that technique is not very effective because it is possible to present different numbers cyclically or to provide some kind of correlation between successive numbers as presented, thus enabling the calculated results that are obtained to be used in reconstituting the secret key.

In order to disturb the operation of the secret key reconstitution algorithm, proposals have also been made to replace transmission of the calculated result in random manner with a result that is independent of the result actually calculated by the secret key algorithm. Thus, regardless of the disturbances inflicted by the attacker, the result received is independent of the originally issued number, thus causing the algorithm for reconstituting the secret key to search in erroneous manner for a correlation between the number issued and the result received. Unfortunately, transmitting a random result leads to a negative comparison with the authentication result, thereby causing an anomaly signal to be generated, and runs the risk of disturbing a bonafide user.

OBJECTS AND SUMMARY OF THE INVENTION

The invention provides a security method for making secure an authentication method of the above-specified type, the security method comprising steps of calculating a test result from a reference random number subjected to the secret key algorithm, of comparing the test result with a reference result, and of ensuring that the calculated result is transmitted only when the test result is identical to the reference result.

Thus, when the algorithm is subjected to disturbances by an attacker, then the attacker is prevented from receiving information that results from the disturbances caused.

In an advantageous version of the invention, a random result is transmitted when the test result is different from the reference result. Thus, the attacker has the impression of receiving information that is the result of the generated disturbance, whereas in fact the information received is entirely independent thereof and is of no use in determining the secret key.

In another advantageous version of the invention, the steps of the security method are performed on a random basis. This reduces the average time taken to verify the algorithm.

In yet another advantageous version of the invention, the secret key algorithm includes at least one intermediate stage and a comparison between an intermediate test result and an intermediate reference result is performed at the end of at least each intermediate stage. Verification can then be performed systematically without excessively increasing total execution time. In a preferred implementation of this version of the invention, the number of intermediate stages subjected to steps of the security method and/or the selection of said stages is determined in random manner. Under such circumstances, the security method preferably further includes a time delay step of duration that is determined so that a response is transmitted in a length of time that is not correlated with the stages of the algorithm that are subjected to the security method. This prevents an attacker being informed about the verification performed by observing the time that elapses between transmitting the random number and receiving the result.

BRIEF DESCRIPTION OF THE DRAWINGS

Other characteristics and advantages of the invention appear on reading the following description of two preferred implementations of the security method of the invention, described with reference to the accompanying figures, in which:

FIG. 1 is a block diagram of a first implementation of the security method of the invention; and FIG. 2 is a block diagram of a second implementation of the security method of the invention.

MORE DETAILED DESCRIPTION

With reference to FIG. 1, the authentication method comprises in conventional manner the steps of submitting a random number 1 to a secret key encrypting algorithm 2 in order to obtain a calculated result 3.

According to the invention, the security method includes the steps of submitting a reference random number 4 to the secret key algorithm 2 to obtain a test result 5, and comparing the test result with a reference result 6, where the test result will be identical thereto providing the operation of the secret key algorithm has not been disturbed. In the preferred implementation shown in FIG. 1, the security method includes, for the case where the test result is not identical with the reference result, a step 7 in which a random result is transmitted, i.e. a number that has the same structure as the calculated result but in which at least a portion has been obtained in a random manner, it being possible for the remainder to be constituted by portions of the calculated result. Otherwise, if the test result is indeed identical to the reference result, that means the algorithm has operated normally and the security method then includes a step 8 of transmitting the calculated result 3.

Concerning the random reference number and the reference result, it should be observed that these may be constituted by a single pair which is used on each occasion that the security method steps are implemented, or by a pair that is extracted randomly from a table having a plurality of reference random numbers and corresponding reference results.

As mentioned above, the security method steps are preferably not performed on each occasion that a number is submitted to the secret key algorithm, but are performed, on the contrary, on a random basis. This makes it possible for the total duration of processing time to be increased only from time to time, while still making it possible to detect attempts at fraud on a statistical basis.

FIG. 2 shows another implementation of the method of the invention in which steps identical to those of FIG. 1 are given the same numerical references. The method of the second implementation differs from the method shown in FIG. 1 essentially by the fact that the reference random number is constituted in this case by the received random number which is then subjected to the secret key cryptographic algorithm twice running, a first time to give a calculated result that also serves as the reference result, and a second time to give a test result, and it is these two results that are compared with each other.

In addition, in this embodiment the secret key algorithm is subdivided into two stages, an intermediate stage 2.1 serving to obtain an intermediate calculated result 3.1 and an intermediate test result 5.1 which are subjected to a first comparison, and a final stage 2.2 which, in this example, is engaged only if the comparison of the intermediate results is positive, and which allows a calculated result 3.2 and a test result 5.2 to be obtained that are subjected to a second comparison. When either of the comparisons gives rise to non-identity, a random result 7 is transmitted. In order to ensure that the apparent processing time, i.e. the time that elapses between a random number 1 being submitted and a response being transmitted, cannot give information concerning the number or the choice of algorithm stages that are subjected to verification, the method also includes a time delay step 9 of duration that can either be calculated so that the total processing time is constant, or else that is determined so that the total time appears to be random.

Naturally, the invention is not limited to the embodiments described and it is possible to provide variants without thereby going beyond the ambit of the invention as defined in the claims.

In particular, although the second embodiment describes a secret key algorithm that is subdivided into two stages only, it is possible to increase the number of stages and correspondingly increase the number of comparisons between intermediate calculated results and intermediate test results. Implementation of a multistage secret key algorithm can also be performed in the context of the first implementation. Under such circumstances, it is possible either to reinject the intermediate test result into the following stage of the secret key algorithm, or else to start again with a new reference random number and then compare the intermediate test result that is obtained with the corresponding intermediate reference result.

When comparison between the test result and the reference result is negative, it is also possible to permanently disable the secret key algorithm so as to foil any further attack. In order to avoid disabling the secret key algorithm merely as a result of a genuinely accidental disturbance, it is also possible to provide an anomaly counter so as to disable the secret key algorithm only after some determined number of anomalies.

What is claimed is:

1. A security method for making secure an authentication method that includes the steps of obtaining a calculated result from a random number submitted to a secret key algorithm, the security method comprising steps of:

calculating a test result from a reference random number subjected to the secret key algorithm, comparing the test result with a stored reference result obtained when submitting said reference number to said secret key algorithm, and ensuring that the calculated result is transmitted only when the test result is identical to the reference result.

2. A security method according to claim 1, wherein a random result is transmitted when the test result is different from the reference result.

3. A security method according to claim 1, wherein the steps of the security method are performed on a random basis.

4. A security method according to claim 1, wherein the secret key algorithm includes at least one intermediate stage and wherein a comparison between an intermediate test result and an intermediate reference result is performed at the end of at least each intermediate stage.

5. A security method according to claim 4, wherein the number of intermediate stages subjected to steps of the security method is determined in random manner.

6. A security method according to claim 5, further including a time delay step of duration that is determined so that a response is transmitted in a length of time that is not correlated with the stages of the algorithm that are subjected to the security method.

7. A security method according to claim 4, wherein the intermediate stages subjected to the steps of the security method are selected in random manner.

8. A security method according to claim 1, wherein the reference result is the calculated result.

9. A security method according to claim 1, wherein the reference random number and the reference result are stored prior to implementing the security method.

10. A security method according to claim 9, wherein the reference random number and the reference result are extracted in random manner from a table comprising a plurality of reference random numbers and of corresponding reference results.

\* \* \* \* \*